UNITED STATES PATENT OFFICE.

LOUIS A. EBERHARDT, OF NEW YORK, N. Y.

PROCESS OF TREATING SILICATES CONTAINING POTASSIUM AND ALUMINIUM.

1,310,413.      Specification of Letters Patent.      Patented July 22, 1919.

No Drawing.     Application filed December 7, 1918. Serial No. 265,749.

*To all whom it may concern:*

Be it known that I, LOUIS A. EBERHARDT, a citizen of the United States, and a resident of New York city, in the county and State of New York, have invented certain new and useful Improvements in Processes of Treating Silicates Containing Potassium and Aluminium, of which the following is a specification.

My invention relates to the treatment of silicates containing potassium and aluminium, for the purpose of producing potassium salts (say, potash alum) and aluminium salts (say, aluminium sulfate), and incidentally recovering certain valuable by-products.

The production of potash alum and of aluminium sulfate from silicates of the character of sericite (potassium-mica, a complex mineral consisting chiefly of silicates of aluminium and potassium) has been proposed hitherto, but my present process will yield a much greater output of these products from the same amount of raw material, than the methods disclosed heretofore.

For this purpose, I first calcine a mixture of sericite or other potassium-aluminium silicate, calcium fluorid preferably in the form of fluorspar and calcium sulfate preferably in the form of gypsum, and having thus brought the sericite or its equivalent to a condition in which it responds more readily to the subsequent treatment, I subject it to the action of acid (say, sulfuric acid), with additional steps following where a thorough utlization of all the products is desired.

An example of my process is as follows:—

The powdered potassium aluminium silicate (sericite, feldspar, slate or the like) of a fineness of about 100 mesh, is intimately mixed with calcium fluorid (powdered fluorspar) and powdered calcium sulfate (calcined gypsum), in the proportion of say, 100 parts (by weight) of potassium aluminium silicate, 10–20 parts of calcium fluorid, and 2–5 parts of calcium sulfate. This mixture is calcined in a suitable furnace, preferably a rotary one, at a fairly good red heat, the operation being completed in say two hours.

The calcined mixture is then treated with an acid, preferably sulfuric acid of about 50° Bé. (about 62.5% $H_2SO_4$) in sufficient amount to combine with the aluminium and with the potassium to form the desired salts, potassium aluminium and aluminium sulfate. This treatment with acid may last two hours and is conducted while heating to a temperature of say from 150–300° C., preferably in a closed lead-lined tank having a suitable outlet for the silicon fluorid or hydrofluosilicic acid which is formed by the action of the liberated hydrofluoric acid, on the silica of the mineral (and on the water of the dilute acid). This silicon fluorid, respectively hydrofluosilicic acid, is a valuable by-product of my process, obtained at first in gaseous or vapor form, and subsequently condensed in a suitable receiver having a cooling arrangement. It will be understood that hydrofluoric acid is liberated by the action of the sulfuric (or other) acid on the calcium fluorid.

The main product of this treatment is a mixture of soluble and insoluble substances, the soluble substances being mainly potassium aluminium (double sulfate of potassium and aluminium) and aluminium sulfate, together with some free acid, while the insoluble residue consists chiefly of silica, calcium sulfate, and more or less undecomposed mineral. The mixture is preferably washed with hot water for a better extraction of the soluble constituents, whereupon the liquid is separated from the solid residue, preferably by filtration, and the residue may be washed to obtain a further extraction.

The solid, insoluble residue may be utilized in the manufacture of artificial stone, etc.

The liquid (filtrate) is concentrated by evaporation, resulting in the formation of crystals (commercially pure) of potash alum. The remaining mother liquor, which contains chiefly aluminium sulfate (with some potash-alum) is further evaporated to produce crystals of aluminium sulfate.

I have ascertained by tests that the calcining treatment forming the first step of my process, has the effect (probably by a catalytic action) of converting the sericite or other potassium-aluminium silicate into a form in which it will be acted upon much more readily by the acid applied subsequently so that I obtain a much larger extraction than hitherto, of both the potassium and the aluminium contained in the sericite or equivalent raw material. The process is therefore of great industrial and commercial efficiency.

In practising the first step of my process I may omit the use of calcium sulfate. I have, however, found that when I omit this substance I need a higher degree of heat to perform the calcining treatment, and do not obtain quite as large a proportionate yield. I am therefore of opinion that the calcium acts both as a flux and as a catalytic agent.

I claim:

1. The method which consists in first calcining a mixture of potassium-aluminium silicate, calcium fluorid, and calcium sulfate, then treating the resulting product with an acid, and subsequently extracting the soluble salts of aluminium and potassium.

2. The method which consists in first calcining a mixture of potassium-aluminium silicate, calcium fluorid, and calcium sulfate, then treating the resulting product with sulfuric acid and removing the compound formed by the liberated hydrofluoric acid, and subsequently extracting from the remaining product, the soluble salts of aluminium and potassium.

3. The method which consists in calcining a mixture of potassium aluminium silicate and calcium fluorid, then treating the resulting product with an acid, and subsequently extracting the soluble salts of aluminium and potassium.

4. The method which consists in calcining a mixture of potassium aluminium silicate and calcium fluorid, then treating the resulting product with sulfuric acid and removing the compound formed by the liberated hydrofluoric acid, and subsequently extracting from the remaining product, the soluble salts of aluminium and potassium.

LOUIS A. EBERHARDT.